(12) United States Patent
Gray

(10) Patent No.: US 11,158,892 B2
(45) Date of Patent: Oct. 26, 2021

(54) PLUG AND PLAY ENERGY STORAGE SYSTEM

(71) Applicant: GE Energy Power Conversion Technology Limited, Warwickshire (GB)

(72) Inventor: Stuart Gray, Houston, TX (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 105 days.

(21) Appl. No.: 16/368,830

(22) Filed: Mar. 28, 2019

(65) Prior Publication Data
US 2020/0313254 A1   Oct. 1, 2020

(51) Int. Cl.
| | |
|---|---|
| *H01M 10/625* | (2014.01) |
| *H01M 10/613* | (2014.01) |
| *H01M 10/6561* | (2014.01) |
| *H01M 10/663* | (2014.01) |
| *H01M 10/6567* | (2014.01) |
| *B63J 99/00* | (2009.01) |
| *B63H 21/38* | (2006.01) |
| *H01M 50/20* | (2021.01) |

(52) U.S. Cl.
CPC ........ *H01M 10/625* (2015.04); *B63H 21/383* (2013.01); *B63J 99/00* (2013.01); *H01M 10/613* (2015.04); *H01M 10/6561* (2015.04); *H01M 10/6567* (2015.04); *H01M 10/663* (2015.04); *H01M 50/20* (2021.01); *B63B 2209/00* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 5,798,633 A | 8/1998 | Larsen et al. | |
| 2006/0191463 A1* | 8/2006 | Little | B63B 35/34 |
| | | | 114/292 |
| 2010/0071979 A1* | 3/2010 | Heichal | B60L 50/64 |
| | | | 180/68.5 |
| 2019/0097288 A1* | 3/2019 | Oh | H01M 10/6569 |

FOREIGN PATENT DOCUMENTS

| | | |
|---|---|---|
| JP | 2010116070 A | 5/2010 |
| JP | 2010116071 A | 5/2010 |
| JP | 2010116847 A | 5/2010 |

* cited by examiner

*Primary Examiner* — Jeremiah R Smith
(74) *Attorney, Agent, or Firm* — Wood IP LLC

(57) ABSTRACT

Provided is an energy storage system for a marine vessel. The energy storage system includes a battery pack and a storage container (i) configured for housing the battery pack and other components and (ii) including an electrical interface for electrically coupling the battery pack to the vessel. The energy storage system also includes an air blast cooling system (i) mountable to a first section of the container and (ii) for cooling the battery pack and an air conditioning system configured for cooling the other components.

11 Claims, 4 Drawing Sheets

PLUG AND PLAY ENERGY STORAGE SYSTEM

I. TECHNICAL FIELD

The present invention generally relates to energy storage systems for marine vessels. In particular, the present invention relates to portable energy storage systems for marine vessels configured for quick turnaround or operation in multiple power configurations.

II. BACKGROUND

Electricity is a viable power source not only for automobiles, but also for supply vessels, yachts, ferries, and other marine vessels. Energy storage, however, can pose unique challenges for marine vessels.

For example, ferries typically require a very fast turnaround during crossings. To control propulsion, the ferry can run entirely on batteries. When it arrives at port and its cargo is offloaded, the ferry must be readied for its next crossing in as little as 10 minutes. However, technology is not available to fully recharge the batteries this quickly to prepare the ferry for its next trip. Specifically, although ferries have a means of recharging batteries on board via diesel generators etc., these approaches are largely inefficient.

As energy storage systems become more common place in the marine industry, the industry standard is to implement a permanent fixed asset into the vessel's power system. However, an energy storage system as a permanent fixed asset can represent a significant capital expenditure.

Once an energy storage system has been integrated into the vessel's power system as a permanent fixed asset, it remains a permanent installation feature throughout the vessel's entire lifecycle. It cannot be removed from the vessel, cannot be swapped out, and cannot be shared. Accordingly, options for recharging and maintenance are limited.

For example, expensive remedies are available for recharging the batteries. One such remedy provides for automatically recharging the batteries via the vessels power network. Alternatively, once the vessel returns to port, it will encounter costly downtime required for maintenance or recharging the batteries. In one additional approach, suppliers of energy storage systems will try to sell shipping companies multiple systems as spares, as a means of reducing maintenance time. However, this approach may be the most expensive of the available options.

These limited options notwithstanding, shipping companies with multiple vessels are required to outfit their vessels with energy storage systems tailored to meet specific contract requirements. As such, these companies are restricted as to which vessels they can use for specific contracts. While companies may ultimately desire to equip their entire fleet of vessels with energy storage capability, the associated capital expenditures can make this desire impossible to satisfy.

III. SUMMARY

Given the aforementioned deficiencies, a need exists for methods and systems for providing energy storage systems on marine vessels that can be containerized and configured for removal and charging onshore. Additionally, methods and systems are needed that will allow companies to spread the outlay for energy storage over longer terms or possibly as rentals rather than owned assets. Methods and systems are also needed to more efficiently recharge batteries and prevent the batteries from fully discharging, which reduces lifetime. Further, systems are needed that provide the ability to share energy storage systems between vessels, allowing companies to reduce the risk of damaging batteries during periods when the vessels are not operating.

Under certain circumstances, embodiments of the present invention provide an energy storage system for a marine vessel. The energy storage system includes a battery pack and a storage container (i) configured for housing the battery pack and other components and (ii) including an electrical interface for electrically coupling the battery pack to the vessel. The energy storage system also includes an air blast cooling system (i) mountable to a first section of the container and (ii) for cooling the battery pack and an air conditioning system configured for cooling the other components.

Embodiments of the present invention equip marine vessels with the ability of being energy storage ready by providing energy storage systems in containerized form, capable of quick connection/disconnection. This ability (i.e., plug-and-play approach) allows companies to share the technology from vessel to vessel, based on the greatest return or on contractual requirements. By sharing assets, shipping companies can own fewer assets and reduce capital expenditures.

The embodiments, using the described plug-and-play approach, also permit easy transportation for repairs shoreside rather than expensive offshore interventions from service companies. If required, another container can be quickly swapped out for reduction of downtime. The exemplary plug-and-play approach facilitates quick and easy isolation for maintenance. An air blast heat exchange cooling technique reduces costs of installs and negates the need for piping, isolation, and instrumentation.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Embodiments of the present invention provide portable/transportable energy storage units that facilitate plug-and-play exchange with other units. This plug-and-play exchange permits a very quick turnaround of vessels at port requiring recharging of batteries. This approach provides an advantage over conventional marketplace solutions having energy storage systems permanently installed on a vessel throughout its lifecycle.

Embodiments of the present invention provide a completely transportable energy storage unit, movable from a vessel to shore, and replaceable by a fully charged unit. Alternatively, a single unit can be shared or rented across several vessels. For example, the energy storage unit can be put on one vessel and used for one contract duration then removed from the vessel and placed on the next vessel for a different contract.

Alternatively, in the case of a vessel at port not operating because its batteries are fully discharged, its energy storage unit can be serviced at a charging station to maintain the health of the batteries or can be exchanged for a fully charged energy storage unit.

Embodiments of the present invention may also be applied to a commercial rental model for marine vessel energy storage. By way of example, instead of customers having enormous capital expenditures on the content of a permanent container, that cost can be borne by others. That is, the customers can lease the container or rent the container by the hour etc.

In one exemplary embodiment, modifications required to make a vessel energy storage ready can include:

1) Power feeds from a switchboard or transformer including protection systems and cables with interlocked plugs and sockets to be run to locations on the container;

2) Power management system connections to be setup with the following signals to be setup in registers for transmit/receive: battery energy storage system (BESS) auxiliaries start/stop/status, circuit breaker open/close/status, energy store start/stop/status, dynamic support mode on/off power management system (PMS) spinning reserve/available power (kW) signal, state of charge, charging/discharging/on line, charge permit signal fast charge signal, ES convertor/Swbd will provide 1 kW/KVAr status, including charging alarms and status to PMS KW demand from PMS to BESS (if required for pre-emptive load peak sharing) power available for charging;

3) Dynamic positioning mimic update; and

4) Vessel automation mimic update.

Figure 1:
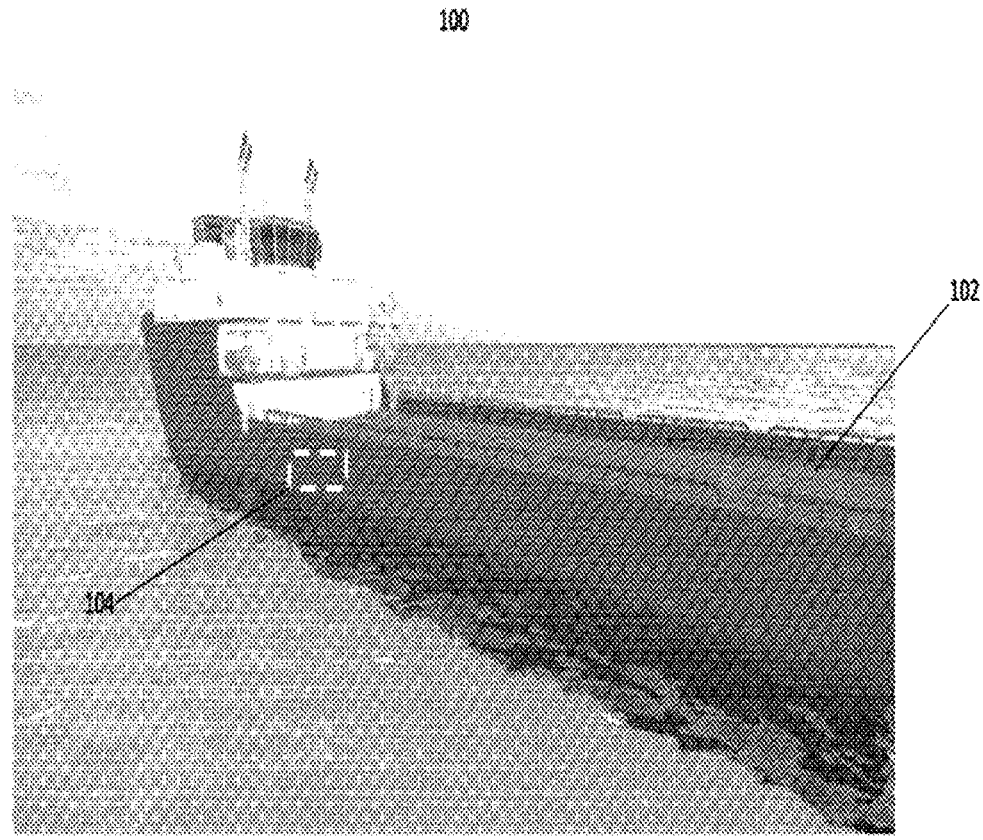
FIG. 1 is an illustration of a conventional supply vessel with storage containers upon which embodiments of the present invention may be implemented.

FIG. 1 is an illustration of a conventional supply vessel 100 upon which embodiments of the present invention may be practiced. The conventional supply vessel 100 includes storage containers 102. The supply vessel 100 also includes a permanently fixed energy storage system (not shown) at a storage location 104 integrated into the vessel's power system. In the case of the supply vessel 100, options for recharging and maintenance of the batteries are limited. Considering the special case of a different type of marine vessel, such as a ferry. For ferries, once the vessel's batteries become discharged, being a permanent fixed asset, they cannot be removed from the vessel to be swapped out or shared.

Figure 2:
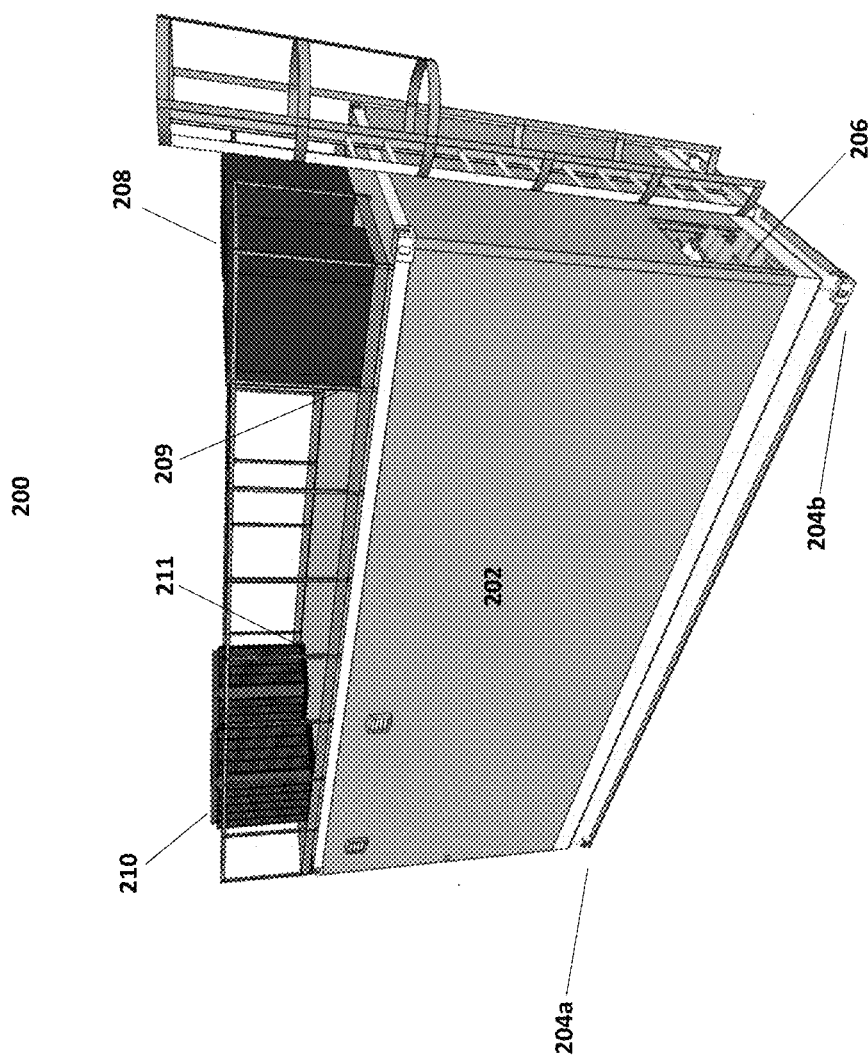
FIG. 2 is an illustration of an exemplary energy storage system constructed and arranged in accordance with embodiments of the present invention.

FIG. 2 is an illustration of an exemplary energy storage system 200 constructed in accordance with embodiments of the present invention. The exemplary energy storage system 200 includes a container 202 with plug-and-play connectors constructed to minimize the number of overall connections required. The container 202 is configured to house one or more battery packs (discussed below).

By way of example, the container 202 can be dropped on the backend of a ship and secured with standard shipping container locks so that it locks to the deck automatically. Once the container 202 is secured, the crew can plug-in the plug-and-play cables to quick connect/quick disconnect sockets (discussed below).

The energy storage system 200 also includes connecting points 204a and 204b for connecting the container 202 to a deck of a vessel, such as the vessel 100. In the embodiments, each of the connecting points 204a and 204b can latch onto welded eyes (not shown) on board the deck of the vessel and it would lock into position. Generally, marine vessels are fitted with welded twist locks, used on standard supply vessels. In this manner, operators can perform the welding and locking of the container 202, fairly quickly. The container can be lifted and secured on and off the deck using standard marine vessel lifting shackles.

Plug-and-play sockets 206 permit quick connect/quick disconnect of cables to the energy storage system 200. Connection can occur with such ease that any crew member or member of the public can connect the cables. In conventional energy storage systems, these connections would be hardwired and would require electricians to connect the cables and complete the installation.

In additional embodiments, auxiliary power feeds, including protection systems and cables with plugs and sockets, are run to the location of the container. When lifted onboard, the plugs to the auxiliary power and PMS link can be made and then the main power plugs can be connected which will allow the keys to be released and the power feeds energized.

Internal power electronics in the container 202, and batteries, are water-cooled. Fans or air blast chiller/channel heat exchangers 208 remove heat out of cooling water inside the container 202 into the atmosphere. In the exemplary embodiment of FIG. 2, the air blast chiller/channel heat exchangers 208 are provided atop the container 202 via an opening or cutaway 209 in a top of the container 202. This approach eliminates the need for pipe cooling water and plumbing for the connection and disconnection of the container 202. It also eliminates the need for isolation and instrumentation. Conventional systems would use a standard pipe water system.

In the exemplary embodiments, however, other components within the container 202, that also generate heat, are not water-cooled. These other components require a more standard air conditioning unit for cooling. Accordingly, the energy storage system 200 includes air conditioning units 210 to provide this additional cooling function. The air conditioning unit is affixed to the container 202 via an opening or cutaway 211 in the top of the container 202.

Figure 3:
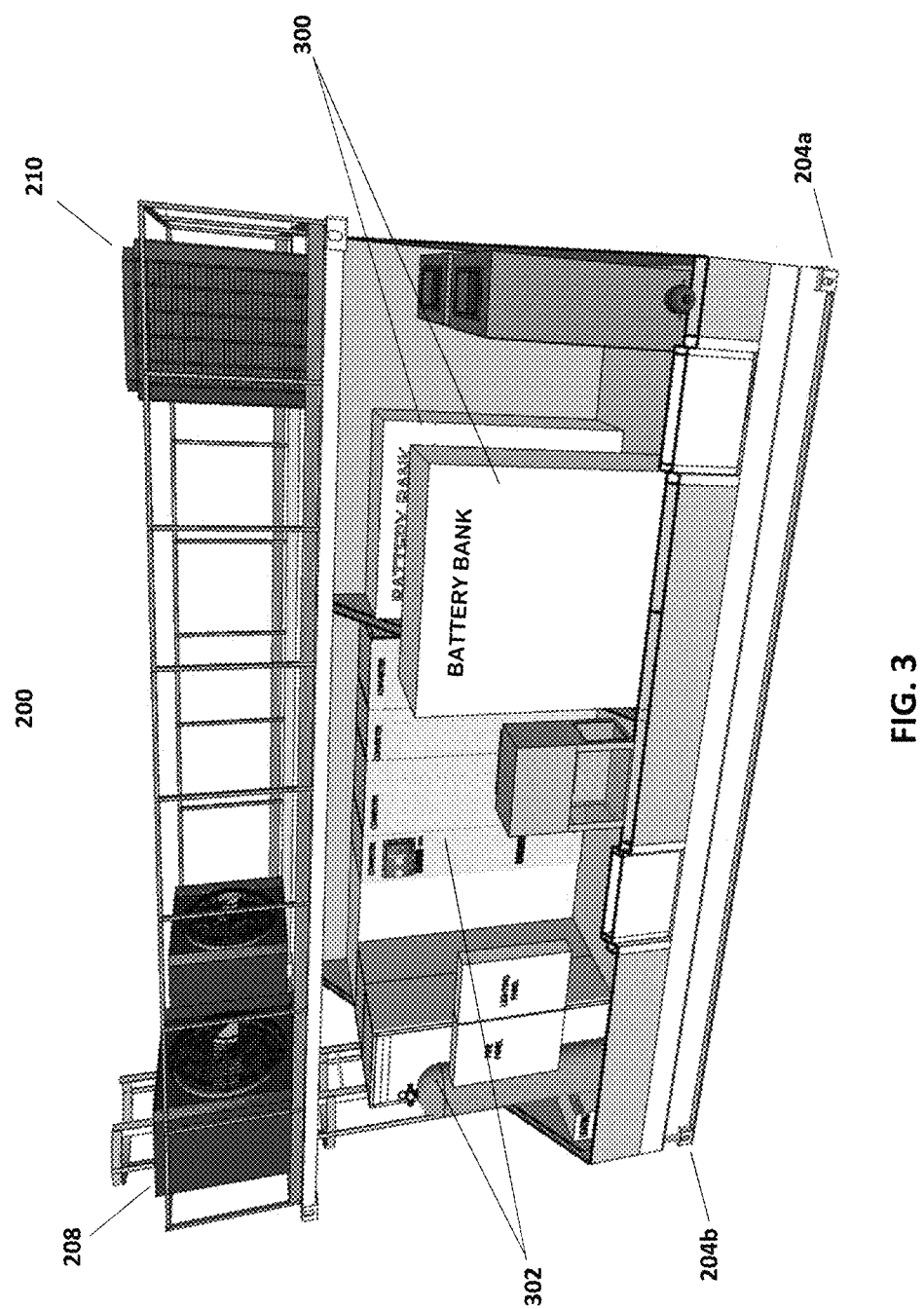
FIG. 3 is an illustration of an alternative view of the exemplary energy storage system depicted in FIG. 2.

FIG. 3 is an illustration of an alternative view of the exemplary energy storage system 200 depicted in FIG. 2.

FIG. 3 provides an illustration of battery banks 300 and components 302 within the container 202.

Figure 4:
FIG. 4 is an illustration of the supply vessel of FIG. 1 configured to implement the exemplary energy storage system of FIG. 2 in accordance with the embodiments.

FIG. 4 is an illustration of a section 400 of the supply vessel 100 of FIG. 1. The section 400 is configured to implement the exemplary energy storage system 200 of FIG. 2 in accordance with the embodiments. In FIG. 4, the supply vessel 100 has been modified, as described above, to accommodate the portable energy storage system 200. By way of example, the energy storage system 200 provides at least 1.4 MW of power.

Additional benefits of the embodiments are realized in maintenance savings. For example, it can be expensive to have service technicians, and other trained professionals, to go offshore and work on marine vessels. Energy storage units, constructed in accordance with the embodiments, provide the ability to perform all the services needed to maintain the container from year to year by packing up the container and leaving it on the harbor. Service technicians, therefore, can service the container at the harbor.

The inventors have created 3-dimensional models of the container including the plug/socket arrangement and air-cooling system. The inventors have also tested the energy storage system in the United Kingdom utilizing the batteries and converter configured for use with the container.

The detailed description is not meant to be limited in its scope of disclosure. Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A portable, replaceable energy storage system for a marine vessel, comprising:
   a battery pack secured therein;
   a storage container configured for housing the battery pack and other internal power components therein, the storage container comprising a means for connecting the storage container to a deck of the marine vessel, an electrical interface for electrically connecting and disconnecting the battery pack to and from the marine vessel and a first and second opening at a top surface of the storage container;
   an air blast cooling system which provides water cooling for the battery pack, the air blast cooling system comprising heat exchangers mounted atop the container in the first opening above a location of the battery pack and spaced apart from and not directly contacting the battery pack; and
   an air conditioning system mounted in the second opening and configured to cool the other internal power components without water cooling.

2. The energy storage system of claim 1, wherein the means for connecting the storage container to a deck of the marine vessel comprises connecting points for connecting to the deck of the marine vessel.

3. The energy storage system of claim 2, wherein the connecting points are configured to connect to welding attachments affixed to the deck of the marine vessel.

4. The energy storage system of claim 1, wherein the electrical interface includes a plug-and-play connection socket.

5. The energy storage system of claim 4, wherein the plug-and-play socket is affixed to the container.

6. The energy storage system of claim 4, wherein the plug-and-play socket is affixed to a wall of the container.

7. A portable, replaceable container for a marine vessel configured for housing a battery pack and other internal power components,
   the container comprising:
   a means for connecting the storage container to a deck of the marine vessel
   a plug-and-play interface;
   wherein the plug-and-play interface is configured for electrically connecting and disconnecting the battery pack to and from the marine vessel;
   a first cutaway having affixed thereto an air blast cooling system above a location of the battery pack spaced apart from and not directly contacting the battery pack, the air blast cooling system comprising heat exchangers configured to remove heat from and cool the battery pack via water cooling; and
   a second cutaway having affixed thereto an air conditioning system configured to cool the other internal power components without water cooling.

8. The container according to claim 7, wherein the means for connecting the storage container to a deck of the marine vessel comprises connecting points for connecting to the deck of the marine vessel.

9. The container according to claim 8, wherein the connecting points are configured for coupling to welding attachments affixed to the deck of the marine vessel.

10. The container according to claim 7, wherein the plug-and-play interface is an electrical connection socket.

11. The container according to claim 10, wherein the plug-and-play circuit is positioned in a wall of the container.

* * * * *